Patented Mar. 8, 1938

2,110,546

UNITED STATES PATENT OFFICE 2,110,546

PRODUCTION OF CELLULOSE AND CELLULOSIC PRODUCTS

Henry Dreyfus, London, England

No Drawing. Application April 19, 1935, Serial No. 17,265. In Great Britain May 16, 1934

1 Claim. (Cl. 92—9)

This invention relates to improvements in the production of cellulose and cellulosic products, and particularly the manufacture from wood, wood pulps, straw and similar lignin-containing cellulosic materials, of a cellulose suitable for conversion into cellulose acetate or other cellulose esters or cellulose ethers.

In the past many processes have been described for the manufacture from wood or other ligno-cellulosic materials of cellulose suitable for the manufacture of paper or cellulose derivatives and for other purposes. For the manufacture of paper the soda and the sulphite processes have in general been used. The soda process does not produce a cellulose of sufficiently good quality for conversion into cellulose derivatives, and the sulphite process has in general been adopted where the cellulose is intended for conversion into viscose or other derivatives. It is also known to treat wood or similar ligno-cellulosic materials with nitric acid for the purpose of opening up the material and then to remove the encrusting substances from the cellulose by treatment with alkali. However, cellulose derivatives produced from wood pulps are not, in general, of such good quality as those produced from cotton.

In accordance with the present invention wood or other lignin-containing cellulosic material is subjected to a pretreatment with water or with steam prior to the removal of lignin by chemical reagents. Thus, for example, wood may be soaked for a considerable period in cold or warm water, or may be boiled for shorter periods in water or may be treated with steam. Treatment with steam, preferably wet, under pressure or treatment with water under pressure, especially at a temperature exceeding 100° C., is most efficacious. Thus, for example, the wood, preferably in the form of chips or in other finely divided form, may be treated with water or with wet steam at a temperature above 100° C., for example up to 130 or 150° C. or more for a period of 1 to 2 hours or more. By this treatment the wood is rendered more permeable to the subsequent action of the chemical pulping agent, and a cellulose of superior and uniform qualities is produced. This is particularly noticeable when the subsequent pulping is effected with the aid of nitric acid, but the effect is also marked when the wood is pulped with the aid of alkali, for example caustic soda, sodium sulphide or mixtures of caustic soda and sodium sulphide.

The pretreatment may be followed by pulping or delignification with any suitable chemicals, but, as above indicated, nitric acid delignification or delignification by caustic alkali and/or sodium sulphide or similar alkaline reagents is preferred. The nitric acid or alkaline reagents may, as described in U. S. application S. No. 17,266 filed April 19, 1935 and U. S. application S. No. 16,623 filed April 16, 1935, contain a constituent or constituents of wood for the purpose of protecting the cellulose during the delignification.

Any suitable concentrations, temperatures or other conditions may be used for a nitric acid treatment following a pretreatment with water or steam in accordance with the present invention. Thus, for example, the ligno-cellulosic material, after the pretreatment, may be treated with nitric acid of any concentration up to 20% in the cold or at moderate temperatures or even at the boil. Preferably, however, the conditions are those set out in U. S. application S. No. 17,264 filed April 19, 1935. Such conditions are, for example, treatment with nitric acid of a concentration of 2–10% at a temperature below 100° C., for example from 70 to 95° C. or at lower temperatures.

After the treatment with nitric acid the material may be treated in any desired manner to remove the encrusting materials. It may be freed from nitric acid as far as possible by pressing, centrifuging or the like and may, if desired, be washed. Thereafter it is preferably treated with alkali so as to remove the products of the nitric acid treatment and to purify the cellulose. It may, for example, be treated with cold, moderately strong alkali, for example a caustic soda of 15–20% strength, and/or it may be treated with moderately hot or hot or boiling solutions of alkali of lower concentrations, and especially concentrations of under 5%, for example 1½–3½%. The treatment with such dilute alkali may be relatively vigorous, for example it may be carried out at the boiling point of the alkali solution at atmospheric pressure or may be carried out under pressure either at the boil or below the boil, for example at temperatures of 100–130° C. It is particularly advantageous to employ such dilute alkali under a pressure in excess of the vapour pressure of the alkaline solution at the temperature obtaining; such excess pressure may be produced by, for example, compressed nitrogen or other gas which will not deleteriously affect the treatment. Thus, for example, pressures of 6–10 atmospheres in excess of the vapour pressure of the solution may be employed at temperatures of 100–130° C.

The cellulosic material treated as described above with nitric acid may be subjected to a two-fold treatment with alkali, preferably first with dilute alkali at elevated or moderately elevated temperatures and under atmospheric pressure or super-atmospheric pressures, and then with cold stronger alkali, for example 15–20% caustic alkali solution.

Any one or more of the above treatments may be carried out in stages, for example the nitric acid treatment may be repeated before a treatment with dilute or strong alkali and/or a treatment with dilute alkali may be repeated one or more times.

The nitric acid may be produced in the presence of the wood or other lignocellulosic material. For example wood may be impregnated with a solution of a soluble nitrate and with or without intermediate centrifuging, but preferably without drying, treated with sulphuric acid or other mineral acid to liberate the nitric acid. If desired, water used for the pretreatment of the wood or other lignocellulosic material in accordance with the present invention may contain the nitrate for the subsequent generation of the nitric acid. The concentrations and quantities of nitrate and sulphuric acid or like mineral acid are adjusted to give the desired concentration of nitric acid.

Again, in an alkaline pulping or delignification treatment any suitable concentrations, temperatures and other conditions may be used. Thus, for example, the pretreated wood may be delignified by means of cold, moderately strong alkali, for example a caustic soda of 15–20% strength. Preferably, however, the treatment is with moderately hot or hot or boiling solutions of alkali of lower concentrations, and especially concentrations of caustic soda and/or sodium sulphide of under 5%, for example 1½–3½%. The treatment with such dilute alkali may be relatively vigorous, for example it may be carried out at the boiling point of the alkali solution at atmospheric pressure or may be carried out under pressure either at the boil or below the boil, for example at temperatures of 100–130° C. It is particularly advantageous to employ such dilute alkali under a pressure in excess of the vapour pressure of the alkaline solution, for instance under excess pressure produced by compressed nitrogen or other gas which will not deleteriously affect the treatment. Thus, for example, pressures of 6–10 atmospheres in excess of the vapour pressure of the solution may be employed at temperatures of 100–130° C.

The cellulosic material may be subjected to a two-fold treatment with alkali, preferably first with dilute alkali at elevated or moderately elevated temperatures and under atmospheric pressure or super-atmospheric pressures, and then with cold stronger alkali, for example 15–20% caustic alkali.

The process of the invention may also be applied to other lignin-containing cellulosic materials; for example sulphite pulp, soda pulp or sulphate pulp may be treated for the removal of residual lignin, pentosan etc. after a pretreatment with water or steam according to the invention.

The treatments described above are suitable for treatment of woods of various kinds or wood pulps from such woods. The more resistant woods such as spruce wood or pulps made therefrom may if desired be subjected to somewhat more vigorous treatment conditions than those specified.

The cellulose prepared by the present processes may be utilized for any desired purpose, for example for the manufacture of cellulose derivatives or for the manufacture of paper or other products comprising fibrous cellulose. For these purposes it may be subjected to any desired treatments such as a chlorine bleach or any other bleaching treatment.

For the manufacture of organic esters of cellulose with the aid of organic acid anhydrides the cellulose is preferably first subjected to a treatment with an acid, and particularly a lower fatty acid, for example formic acid or acetic acid. Such acids may be applied in small or large quantities and in liquid or vapour form. Similarly, treatments with mineral acids, for example hydrochloric acid, sulphuric acid or even nitric acid, may be applied, preferably in conjunction with acetic acid or other lower fatty acid. Such treatments are preferably carried out under conditions of temperature, concentration, and quantity of the mineral acid, which do not lead to substantial degradation of the cellulose. A treatment with a lower fatty acid, for example acetic acid, may be applied in such a way as to introduce into the cellulose the catalyst required for the subsequent acetylation or other esterification. If desired, any mineral acid used during the pretreatment may be neutralized or substantially neutralized before applying the esterifying agent. For further details as to the acid pretreatments reference is made to French specification No. 565,654 and U. S. specifications Nos. 1,831,101 and 1,911,069.

For the manufacture of good quality cellulose ethers and for the manufacture of viscose and other cellulose derivatives in which alkali is present during the conversion to the cellulose derivative, pretreatments with mineral and/or organic acids are in general unnecessary and the cellulose may be subjected directly to the treatment for conversion into the desired cellulose derivative. Similarly in making nitrocellulose the nitrating acid may be applied directly to the purified cellulose prepared in accordance with the present invention.

Cellulose esters and ethers made from cellulose produced as above described may be employed in the manufacture of articles such as filaments and yarns of artificial silk and films, foils, moulded articles etc., as also in compositions such as lacquer and other coating compositions and moulding powders.

The following examples illustrate, but do not in any way limit, the invention:—

*Example 1*

Spruce chips, which may with advantage have been treated to remove resins, are heated in a digester to 120° C. with 5 times their weight of water, the temperature being maintained by injecting steam for a period of 90 minutes. The water is then replaced by 4 times its weight of a 3% solution of caustic soda, and the temperature kept between 120° and 130° C. for 10 hours. The contents of the digester are then allowed to cool, and the liquor is drained away from the solid materials, after which the latter are washed and treated with a 15% alkali solution in the cold for about 3 hours. The cellulose material is then freed from alkali and may be subjected to a chlorine bleach.

*Example 2*

Pine chips, which have preferably already been treated to remove resins, are treated in a digester with steam at a temperature of 128° C. under a pressure of 25 lbs. per square inch for about an hour.

A 7% nitric acid solution in amount about 10 times the dry weight of the chips is then introduced into the digester and the chips and acid are heated to about 80° C. for 8 hours. The acid is then run off and the solid materials are washed substantially free from acid. A 3% solution of caustic soda is then introduced into the digester, and the solid materials boiled therewith for about 1 hour.

Especially if the cellulosic products are to be acetylated, they may then be treated with a 15% caustic soda solution in the cold, and this may be followed by a treatment with glacial acetic acid at 60° C. or by any other suitable acid acetylation pretreatment.

What I claim and desire to secure by Letters Patent is:—

Process for the production of cellulose, which comprises treating wood in a digester with steam at a temperature of 128° C. under a pressure of 25 pounds per square inch for about one hour, subjecting the so-treated wood to treatment with a 7% nitric acid solution, in an amount of about 10 times the dry weight of the wood, at about 80° C. for 8 hours, washing the solid materials free from acid and then boiling the solid materials for one hour with a 3% solution of caustic soda.

HENRY DREYFUS.